United States Patent
Seidl et al.

(10) Patent No.: US 12,515,100 B2
(45) Date of Patent: Jan. 6, 2026

(54) LIVE TOURNAMENT PREDICTIONS IN TENNIS

(71) Applicant: STATS LLC, Chicago, IL (US)

(72) Inventors: Robert Seidl, Munich (DE); Peter McKeever, Düsseldorf (DE); Ysabel Gonzalez-Rico, Atlanta, GA (US)

(73) Assignee: STATS LLC, Chicago, IL (US)

( * ) Notice: Subject to any disclaimer, the term of this patent is extended or adjusted under 35 U.S.C. 154(b) by 259 days.

(21) Appl. No.: 18/454,291

(22) Filed: Aug. 23, 2023

(65) Prior Publication Data

US 2024/0066355 A1 Feb. 29, 2024

Related U.S. Application Data

(60) Provisional application No. 63/373,497, filed on Aug. 25, 2022.

(51) Int. Cl.
*A63B 24/00* (2006.01)
*A63B 71/06* (2006.01)
(Continued)

(52) U.S. Cl.
CPC ...... *A63B 24/0062* (2013.01); *A63B 71/0616* (2013.01); *A63F 13/795* (2014.09);
(Continued)

(58) Field of Classification Search
CPC .... A63F 13/795; A63F 13/798; A63F 13/812; A63F 13/816; G07F 17/3276;
(Continued)

(56) References Cited

U.S. PATENT DOCUMENTS

| 7,351,149 B1 * | 4/2008 | Simon | G07F 17/3244 |
| | | | 463/41 |
| 7,740,539 B2 * | 6/2010 | Simon | G07F 17/32 |
| | | | 463/19 |

(Continued)

FOREIGN PATENT DOCUMENTS

WO WO-2016110797 A1 * 7/2016 ......... G07F 17/3288

OTHER PUBLICATIONS

PCT International Application No. PCT/US2023/072704, International Search Report and Written Opinion of the International Searching Authority, dated Dec. 20, 2023, 8 pages.
(Continued)

*Primary Examiner* — William H McCulloch, Jr.
(74) *Attorney, Agent, or Firm* — Bookoff McAndrews PLLC

(57) ABSTRACT

A computing system receives historical match data associated with a plurality of tennis players. The computing system generates player rankings. The player rankings include a player ranking for each tennis player of the plurality of tennis players based on the historical match data. The computing system receives information associated with a tennis tournament. The information includes a subset of tennis players in the tournament and a seeding of each tennis player in the subset of tennis players. The computing system generates initial predictions based on the information associated with the tournament and the player rankings. The computing system identifies a trigger event that causes an update to the initial predictions. Responsive to identifying the trigger event, the computing system generates an updated predictions based on in-match data. The in-match data includes a change to a score in a match of the tournament. The computing system outputs the updated predictions.

20 Claims, 10 Drawing Sheets

(51) Int. Cl.
*A63F 13/795* (2014.01)
*A63F 13/798* (2014.01)
*A63F 13/812* (2014.01)
*A63F 13/816* (2014.01)
*G07F 17/32* (2006.01)

(52) U.S. Cl.
CPC .......... *A63F 13/798* (2014.09); *A63F 13/812* (2014.09); *A63F 13/816* (2014.09); *G07F 17/3276* (2013.01); *G07F 17/3288* (2013.01); *G07F 17/3295* (2013.01)

(58) Field of Classification Search
CPC . G07F 17/3288; G07F 17/3295; G06Q 10/04; G06Q 50/34; A63B 24/0062; A63B 71/0616
See application file for complete search history.

(56) References Cited

U.S. PATENT DOCUMENTS

| | | | | |
|---|---|---|---|---|
| 8,002,618 | B1* | 8/2011 | Lockton | A63F 13/795 463/9 |
| 8,149,530 | B1* | 4/2012 | Lockton | A63F 13/92 381/103 |
| 8,449,361 | B2* | 5/2013 | Laycock | A63F 13/65 463/16 |
| 8,910,309 | B2* | 12/2014 | Harrison | H04N 21/41415 726/30 |
| 11,232,681 | B2* | 1/2022 | Juan | G07F 17/3288 |
| 11,551,529 | B2* | 1/2023 | Lockton | A63F 13/335 |
| 11,925,871 | B2* | 3/2024 | Brown | A63F 13/795 |
| 12,008,863 | B2* | 6/2024 | Huke | G07F 17/3227 |
| 12,179,085 | B2* | 12/2024 | Vitti | G06F 7/588 |
| 12,354,006 | B2* | 7/2025 | Holbrook | G06N 3/04 |
| 12,354,443 | B2* | 7/2025 | Huke | G07F 17/3269 |
| 12,397,220 | B2* | 8/2025 | Vitti | G06F 7/588 |
| 2003/0177347 | A1* | 9/2003 | Schneier | A63F 13/12 713/151 |
| 2005/0017454 | A1 | 1/2005 | Endo et al. | |
| 2010/0113135 | A1* | 5/2010 | Asher | G06Q 30/0601 463/43 |
| 2011/0065490 | A1* | 3/2011 | Lutnick | G07F 17/3223 463/16 |
| 2011/0275432 | A1* | 11/2011 | Lutnick | G07F 17/3244 463/25 |
| 2011/0306428 | A1* | 12/2011 | Lockton | A63F 13/537 463/42 |
| 2012/0129585 | A1* | 5/2012 | Laycock | G06Q 10/10 463/9 |
| 2013/0184039 | A1 | 7/2013 | Steir et al. | |
| 2014/0180451 | A1 | 6/2014 | Marty | |
| 2015/0141175 | A1 | 5/2015 | Pisupati et al. | |
| 2018/0032858 | A1* | 2/2018 | Lucey | G06N 3/08 |
| 2019/0057311 | A1* | 2/2019 | Newell | G06N 5/025 |
| 2020/0230501 | A1 | 7/2020 | Schwartz et al. | |
| 2020/0279160 | A1 | 9/2020 | Holbrook et al. | |
| 2020/0349799 | A1 | 11/2020 | Amaitis et al. | |
| 2022/0108589 | A1* | 4/2022 | Choung | G07F 17/3267 |
| 2024/0066355 | A1* | 2/2024 | Seidl | G06Q 10/04 |
| 2024/0399232 | A1* | 12/2024 | Vitti | G06Q 10/063114 |

OTHER PUBLICATIONS

PCT International Application No. PCT/US22/28523, International Search Report and Written Opinion of the International Searching Authority, dated Aug. 17, 2022, 8 pages.

* cited by examiner

750 PREDICTED ATP RANKINGS
BY THE END OF THE 2023 AUSTRALIAN OPEN

☐ OPTA ANALYST

752

| | RANK | PREDICTED PTS | 1 | 2 | 3 | 4 | 5 | 6 | 7 | 8 | 9 | 10 | 11-20 | 21-30 | 31-40 | 41-50 | 51+ |
|---|---|---|---|---|---|---|---|---|---|---|---|---|---|---|---|---|---|
| S. TSITSIPAS | 4 | 5715 | 18.9 | 8.8 | 18.9 | 51.0 | 2.5 | | | | | | | | | | |
| N. DJOKOVIC | 5 | 5070 | 33.2 | 20.8 | 20.6 | 19.7 | 5.6 | | | | | | | | | | |
| A. RUBLEV | 6 | 3930 | | 5.1 | 3.0 | | 91.9 | 8.2 | | | | | | | | | |
| K. KHACHANOV | 20 | 1885 | | | | | | | | | 10.2 | 2.9 | 78.7 | | | | |
| S. KORDA | 24 | 1325 | | | | | | | | | 12.0 | | 42.5 | 45.5 | | | |
| T. PAUL | 26 | 1185 | | | | | | | | | 11.8 | | 28.1 | 60.0 | | | |
| J. LEHECKA | 39 | 685 | | | | | | | | | | | 4.5 | 23.1 | 72.4 | | |
| B. SHELTON | 42 | 584 | | | | | | | | | | | 4.3 | 6.6 | 28.2 | 60.9 | |

PERCENTAGE PROBABILITIES OF FINISHING IN EACH POSITION FOR PLAYERS IN THE QUARTERFINALS OF AO ARE SHOWN. ONLY PROBABILITIES OF AT LEAST 0.1% ARE LABELLED. RANKING AND POINTS AT THE BEGINNING OF THE TOURNAMENT.

*FIG. 7B*

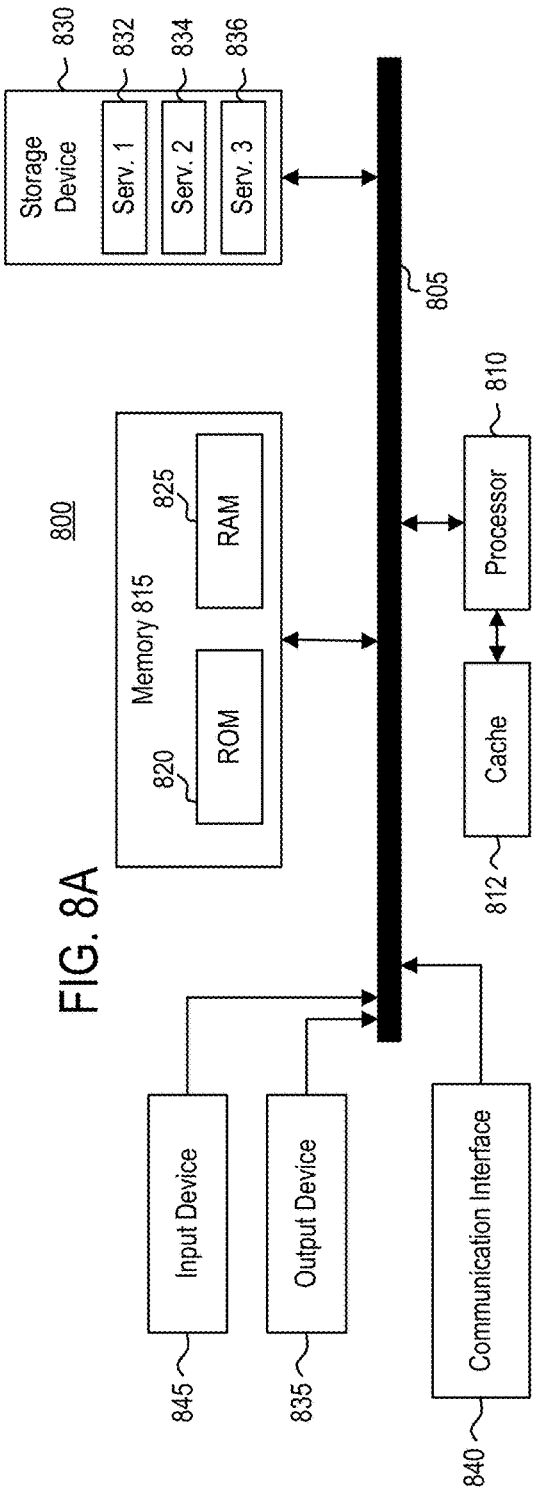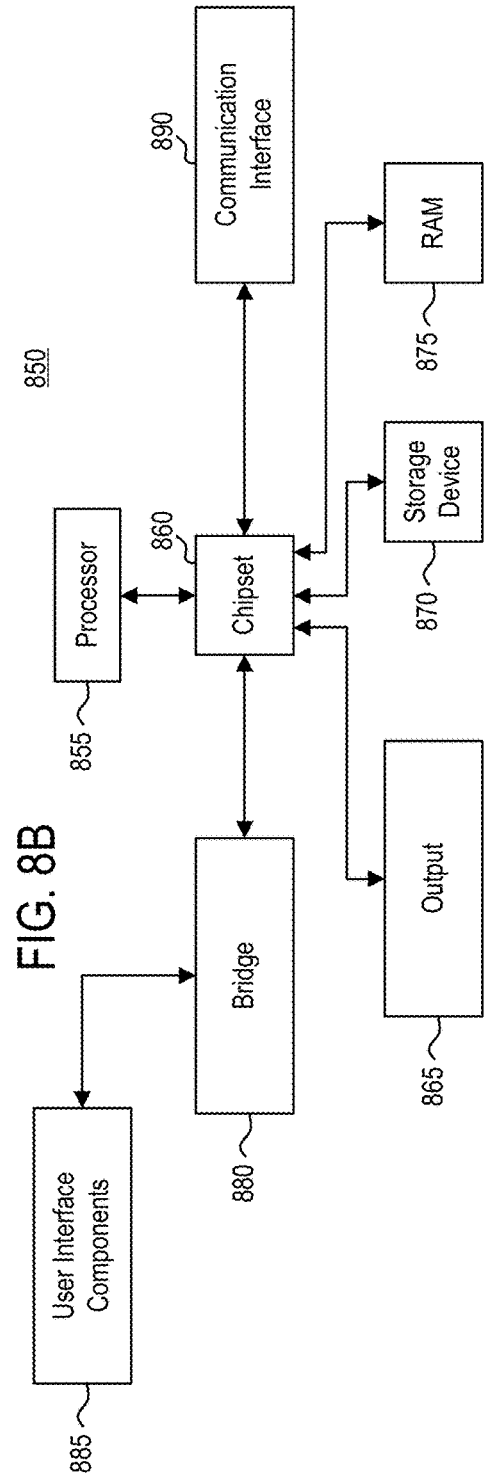

LIVE TOURNAMENT PREDICTIONS IN TENNIS

CROSS-REFERENCE TO RELATED APPLICATIONS

This application claims priority to U.S. Provisional Application Ser. No. 63/373,497, filed Aug. 25, 2022, which is hereby incorporated by reference in its entirety.

FIELD OF THE DISCLOSURE

The present disclosure generally relates to system and method for generating live prediction of player performance in tennis.

BACKGROUND

While many professional sports leagues have varying amounts of sports analytics that drive performance discussion and what-if analyses, such fine-grained statistics is typically absent from tennis. In tennis, there are varying degrees of scoring, from as granular as the game level to as broad as the overall match level.

SUMMARY

In some embodiments, a method is disclosed herein. A computing system receives historical match data associated with a plurality of tennis players. The historical match data includes historical match metrics. The computing system generates player rankings. The player rankings include a player ranking for each tennis player of the plurality of tennis players based on the historical match data. The computing system receives information associated with a tennis tournament. The information includes a subset of tennis players in the tournament and a seeding of each tennis player in the subset of tennis players. The computing system generates initial predictions based on the information associated with the tournament and the player rankings. The computing system identifies a trigger event. The trigger event causes an update to the initial predictions. Responsive to identifying the trigger event, the computing system generates an updated predictions based on in-match data. The in-match data includes a change to a score in a match of the tournament. The computing system outputs the updated predictions.

In some embodiments, a non-transitory computer readable medium is disclosed herein. The non-transitory computer readable medium comprises one or more sequences of instructions, which, when executed by a processor, causes a computing system to perform operations. The operations include receiving, by the computing system, historical match data associated with a plurality of tennis players, the historical match data comprising historical match metrics. The operations further include generating, by the computing system, player rankings, the player rankings comprising a player ranking for each tennis player of the plurality of tennis players based on the historical match data. The operations further include receiving, by the computing system, information associated with a tennis tournament. The information includes a subset of tennis players in the tennis tournament and a seeding of each tennis player in the subset of tennis players. The operations further include generating, by the computing system, initial predictions based on the information associated with the tennis tournament and the player rankings. The operations further include identifying, by the computing system, a trigger event. The trigger event causes an update to the initial predictions. The operations further include, responsive to identifying the trigger event, generating, by the computing system, updated predictions based on in-match data. The in-match data includes a change to a score in a match of the tennis tournament. The operations further include outputting, by the computing system, the updated predictions.

In some embodiments, a system is disclosed herein. The system includes a processor and a memory. The memory has programming instructions stored thereon, which, when executed by the processor, causes the system to perform operations. The operations include receiving historical match data associated with a plurality of tennis players, the historical match data comprising historical match metrics. The operations further include generating player rankings, the player rankings comprising a player ranking for each tennis player of the plurality of tennis players based on the historical match data. The operations further include receiving information associated with a tennis tournament. The information includes a subset of tennis players in the tennis tournament and a seeding of each tennis player in the subset of tennis players. The operations further include generating initial predictions based on the information associated with the tennis tournament and the player rankings. The operations further include identifying a trigger event. The trigger event causes an update to the initial predictions. The operations further include, responsive to identifying the trigger event, generating updated predictions based on in-match data. The in-match data includes a change to a score in a match of the tennis tournament. The operations further include outputting the updated predictions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 7B illustrates an exemplary graphical user interface (GUI) that includes am in-tournament ranking prediction, according to example embodiments.

FIG. 8A is a block diagram illustrating a computing device, according to example embodiments.

FIG. 8B is a block diagram illustrating a computing device, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In sports like tennis, there are many different levels of scoring, which can provide an indication of performance at any point of time at varying scales. For example, in the short term, there is game-level scoring; in this mid-term, there is set-level scoring; and in the long-term, there is match-level scoring. Even though the multi-scale scoring mechanism may provide an indication of which player may be dominating in the short-term, mid-term, and long-term, such approach does not take into consideration other important contextual features, such as player strength/style and court-type information. Additionally, the match-score typically only tells viewers what has happened in the game and cannot convey the importance of each point or simulate alternative outcomes in key moments.

Further, there currently does not exist a system that is able to utilize such short-term, mid-term, and long-term predictions within a match to project the overall outcomes of a tournament. For example, while conventional systems may be configured to generate a probability of a given player winning a tournament or matchup within the tournament, such systems are simply unable to dynamically adjust to current or live game results.

One or more techniques described herein provide an improvement over conventional techniques by providing a system that can provide predictions of a player winning a current matchup or progressing to each round of a tournament based on live game data.

Figure 1:
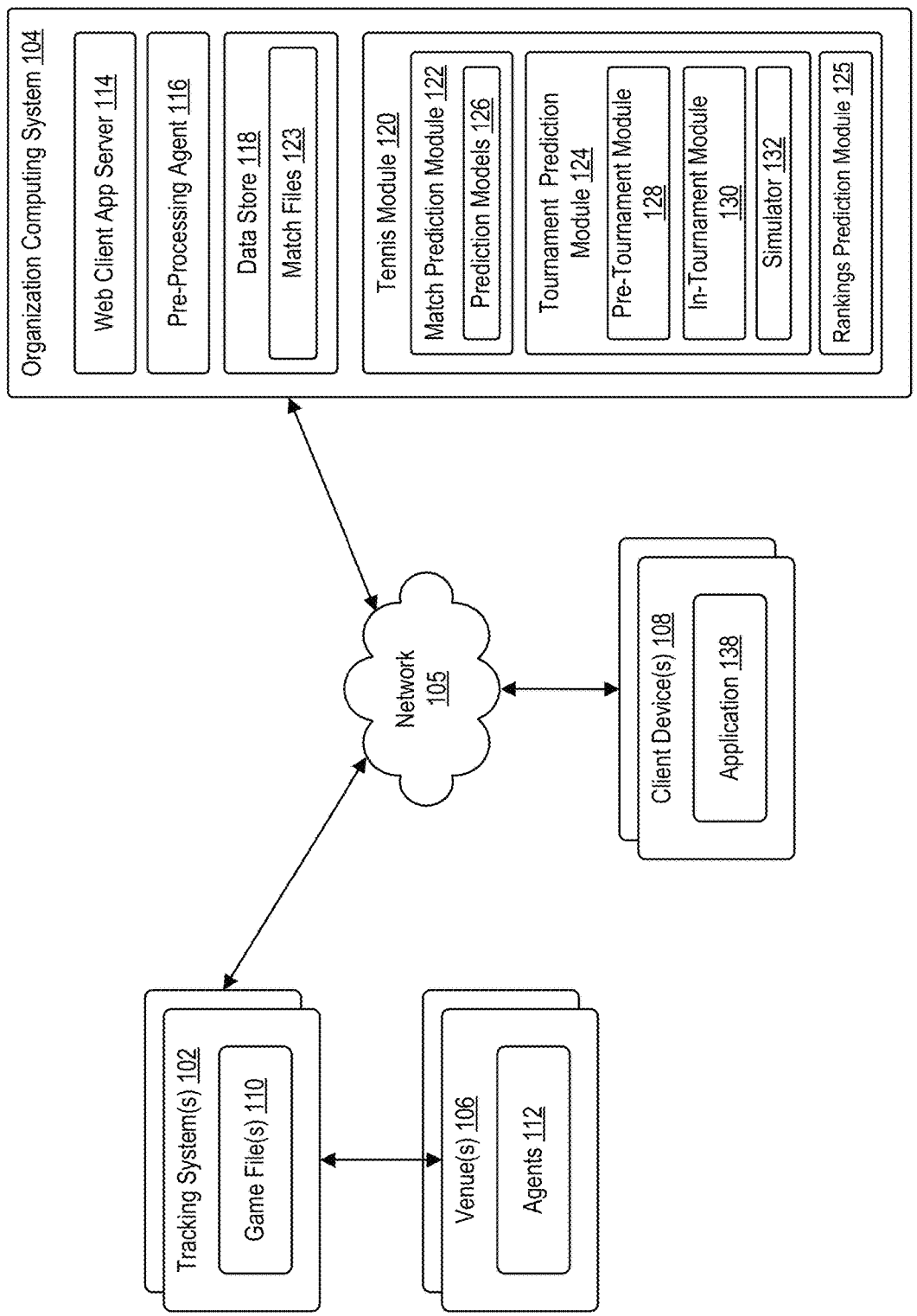
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a match file 110.

Match file 110 may be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102.

Organization computing system 104 may include at least a web client application server 114, a pre-processing agent 116, a data store 118, and tennis module 120. Each of pre-processing agent 116 and tennis module 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more match files 123. Each match file 123 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may correspond to each play-by-play or shot-by-shot event in a particular match. In some embodiments, non-spatial event data may be derived from spatial event data. For example, pre-processing agent 116 may be configured to parse the spatial event data to derive play-by-play or shot-by-shot information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

In some embodiments, each match file 123 may further include match state information. Match state information may include scoring data such as, but not limited to, game scores (e.g., 0, 15, 30, 40, deuce, advantage), set scores (e.g., 0-6 or tie-break to 7), and match scores (e.g., 0, 1, 2 or 0-3 in men's grand slams) at each point of a match. In some embodiments, each match file 123 may further include match-stats and features. Exemplary match-stats and features may include, but are not limited to, a number of aces, winners, forced errors, first/second serve percentage, double faults, forehand winners, backhand winners, volleys during the match, and the like.

Pre-processing agent 116 may be configured to process data retrieved from data store 118. For example, pre-processing agent 116 may be configured to generate one or more sets of information that may be used to train portions of prediction models 126.

Tennis module 120 may be configured to generate one or more metrics before a match or within a match. Tennis module 120 may include match prediction module 122 and tournament prediction module 124. Match prediction module 122 may be configured to generate one or more metrics associated with scoring data at a game-level, a set-level, and/or a match-level. Tournament prediction module 124 may be configured to generate or project an outcome of a tournament based on the game-level, a set-level, and/or a match-level predictions generated by match prediction module 122.

As shown, match prediction module 122 may include prediction models 126. Prediction models 126 may be representative of a liner or non-linear model. For example, prediction models 126 may be representative of a random decision forest model. Prediction models 126 may be trained to generate the various predictions both before a match or within a match. For example, prediction models 126 may be trained using a historical match data taken from a plurality of match files 123. As output, prediction models 126 may generate one or more metrics associated with scoring data at a game-level, a set-level, and/or a match-level.

Exemplary inputs to prediction models 126 may include, but are not limited to, match-state information, match-stats and features, momentum, player one strength, player two strength, player one style, player two style, court-type, weather conditions, and the like. Match-state information may correspond to current game information (e.g., 0, 15, 30, deuce, advantage, etc.), set information (0-6 or 0-7), match score information (e.g., 0-2 or 0-3), and serve information (e.g., player one or player two).

Match stats and features may correspond to a number of aces, winners, forced errors, unforced errors, player one serve percentage, player two serve percentage, double faults, forehand winners, backhand winners, volleys during the match, and the like.

In some embodiments, momentum may correspond to a change in win-probability. In some embodiments, momentum may correspond to how many of the last X points (e.g., last 10 points) the player (player one or player two) has won.

In some embodiments, player one strength may correspond to a relative player ranking or seeding. In some embodiments, player one strength may be derived from recent detailed player statistics and/or pre-game market odds from a sports book or other crowdsourced method. In some embodiments, player two strength may correspond to a relative player ranking or seeding. In some embodiments, player two strength may be derived from recent detailed player statistics and/or pre-game market odds from a sports book or other crowdsourced method. In some embodiments, player strength data may be derived or calculated from spatial data. For example, player strength data may be derived or calculated from RunningBall data available from STATS Perform, another third party data stream provider, or from tracking obtained by tracking system 102.

In some embodiments, player one style may be derived from player one statistics. In some embodiments, player one style may be derived from spatial information of player one's behavior (e.g., heat maps). In some embodiments, player one style may be derived using player one/ball tracking data for fine-grained analysis. In some embodiments, player two style may be derived from player two statistics. In some embodiments, player two style may be derived from spatial information of player two's behavior (e.g., heat maps). In some embodiments, player two style may be derived using player two/ball tracking data for fine-grained analysis. In some embodiments, player style data may be derived or calculated from spatial data. For example, player style data may be derived or calculated from RunningBall data available from STATS Perform, another third party data stream provider, or from tracking obtained by tracking system 102.

In some embodiments, court type may correspond to a playing surface on which the match is occurring (e.g., clay, grass, hard, etc.). In some embodiments, court type may further include information about the state of the playing surface (e.g., court temperature, how worn the grass is, etc.). In some embodiments, weather conditions may correspond to the current weather (e.g., outside temperature, sun location, wind, humidity, etc.).

In some embodiments, inputs to tennis module 120 may be interactive. For example, a user of client device 108 may manually enter in any possible score for prediction models 126 to predict the probabilities of next point, game, set, and/or match via an interactive interface (e.g., widget), chat bot, smart assistant, speech recognizer, or other interactive means.

Exemplary outputs from prediction models 126 may include, but are not limited to: a prediction of what player will win the next point (e.g., 0 or 1), a final score prediction (e.g., multi-class classifier such as {4-0, 4-1, 4-2, 4-3, 0-4, 1-4, 2-4, 3-4}), a final set score prediction (e.g., multi-set classifier such as {6-0, 6-1, 6-2, 6-3, 6-5, 7-5, 7-6, and the reverse}), a final tie break score prediction (e.g., multi-class classifier such as {7-0, 7-1, 7-2, 7-3, 7-4, 7-5, 8-6, and beyond, and reverse}), and/or a final game score prediction (e.g., multi-class classifier such as {2-0, 2-1, 0-2, 1-2, etc.}). In some embodiments, exemplary outputs from prediction models 126 may further include predicted final player statistics (e.g., save percentage, number of aces, number of winners, etc.), predicted serve location or first serve, second serve, "let," double fault, predicted winner location and winner type (e.g., forehand, backhand, volley, smash, etc.), and rally-count.

Tournament prediction module 124 may be configured to generate or project an outcome of a tournament based on the game-level, a set-level, and/or a match-level predictions generated by match prediction module 122. For example, tournament prediction module 124 may be configured to predict how likely each player is to reach the next round in a tennis tournament. In this manner, tournament prediction module 124 can project the likelihood of each player in tournament advancing to each round up to and including the winner of the tournament.

As shown, tournament prediction module 124 may include pre-tournament module 128, in-tournament module 130, and simulator 132. Pre-tournament module 128 may be configured to determine the pre-tournament likelihood of each player in a tournament advancing to each round. In some embodiments, pre-tournament module 128 may generate player ratings for each tennis player associated with a tennis league. For example, for all tennis players associated with the Association of Tennis Professionals (ATP) and/or the Women's Tennis Association (WTA), pre-tournament module 128 may generate a player ranking. In some embodiments, pre-tournament module 128 may generate the player rating based on historical match data associated with each player. In some embodiments, pre-tournament module 128 may generate a player rating for each player based on one or more of Openskill data or ELO data. Such pre-tournament player rating may be routinely updated for subsequent tournament analysis.

When the field for a given tournament is created and the seeds are set, pre-tournament module 128 may generate initial win probabilities for each player in each possible matchup. For example, pre-tournament module 128 may utilize the pre-tournament player ratings and simulator 132 to simulate each round until the final round. In some embodiments, simulator 132 may use a Monte Carlo simulation, where each match win probability may be determined using pre-tournament player rating data. For example, simulator 132 may generate probabilities of each player reaching each round in the tournament, which may allow for the identification of various insights to the tournament, such as, but not limited to, the top Y most likely winners of the tournament, the top X players to reach the semis, the top Z players under 21 to reach a certain round or the most likely round to reach for each player from a specific nationality, and the like. As output, pre-tournament module 128 may generate a table of player vs. player win probabilities once the tournament draw is available. Such table may be used to look up the match win probability of each matchup or potential matchup.

In-tournament module 130 may be configured to update or recalculate the pre-tournament probabilities once the tournament is underway. For example, based on output generated by match prediction module 122, in-tournament module 130 may propagate down the game-level, a set-level, and/or a match-level predictions generated by match prediction module 122 to the update the tournament predictions. For example, when a game score of a live match has changed, match prediction module 122 may be configured to generate game-level, set-level, and match-level predictions for the current game. Given these game-level, set-level, and match-level predictions, in-tournament module 130 may utilize simulator 132 to re-simulate to outcomes of each matchup. For example, if a pre-match and pre-tournament favorite is projected to lose the match, based on an analysis by match prediction module 122, such prediction will have an affect on each matchup prediction in the pre-tournament win probabilities.

In this manner, tennis module 120 may be configured to dynamically update the tournament odds for each player based on live or real-time score information.

In some embodiments, tennis module 120 may further include a rankings prediction module 125. Rankings prediction module 125 may be configured to predict a new player ranking in the ATP/WTA world rankings based on the projections generated for a current tournament. For example, based on the predictions generated by pre-tournament module 128 and/or in-tournament module 130, rankings prediction module 125 may dynamically update or project changes to the ATP/WTA World Rankings.

In some embodiments, rankings prediction module 125 may retrieve information related to a player's previous performance in the tournament. For example, rankings prediction module 125 may identify or retrieve data related to how many points a given player or players gained playing a target tournament the year before. Using this information, rankings prediction module 125 may know how many points each player has to defend in the target tournament this year. Rankings prediction module 125 may further identify or retrieve current world ranking information for players in the target league. For example, rankings prediction module 125 may retrieve or identify current ATP/WTA world rankings. As simulator 132 simulates (pre-tournament) or re-simulates (in-tournament) outcomes for the various matchup scenarios, rankings prediction module 125 may identify where each player in the tournament is projected to finish and how many points each player will be rewarded for the projected tournament finish. Rankings prediction module 125 may then generate new or projected ATP/WTA world rankings based on each player's projected outcome in the tournament and the projected points allocated to each player for the projected outcome. In this manner, rankings prediction module 125 may predict or project updated ATP/WTA world rankings dynamically both before and throughout the life of the tournament.

In some embodiments, such ranking projections may be used to forecast which matches in the tournament may be most exciting. For example, based on the output from rankings prediction module 125, tennis module 120 may identify those matches that are considered "most exciting" for purposes of affecting future rankings in the ATP/WTA world rankings.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 138. Application 138 may be representative of a web browser that allows access to a website or a stand-alone application. Client device 108 may access application 138 to access one or more functionalities of organization computing system 104. Client device 108 may communicate over network 105 to request a webpage, for example, from web client application server 114 of organization computing system 104. For example, client device 108 may be configured to execute application 138 to access fan engagement functionality around the various predictions generated by tennis module 120. In some embodiments, application 138 may take the form of a second screen application or a standalone widget, which may be embedded into existing channels. In some embodiments, application 138 may allow a user to enter interactive inputs for analysis by tennis module 120.

Figure 2:
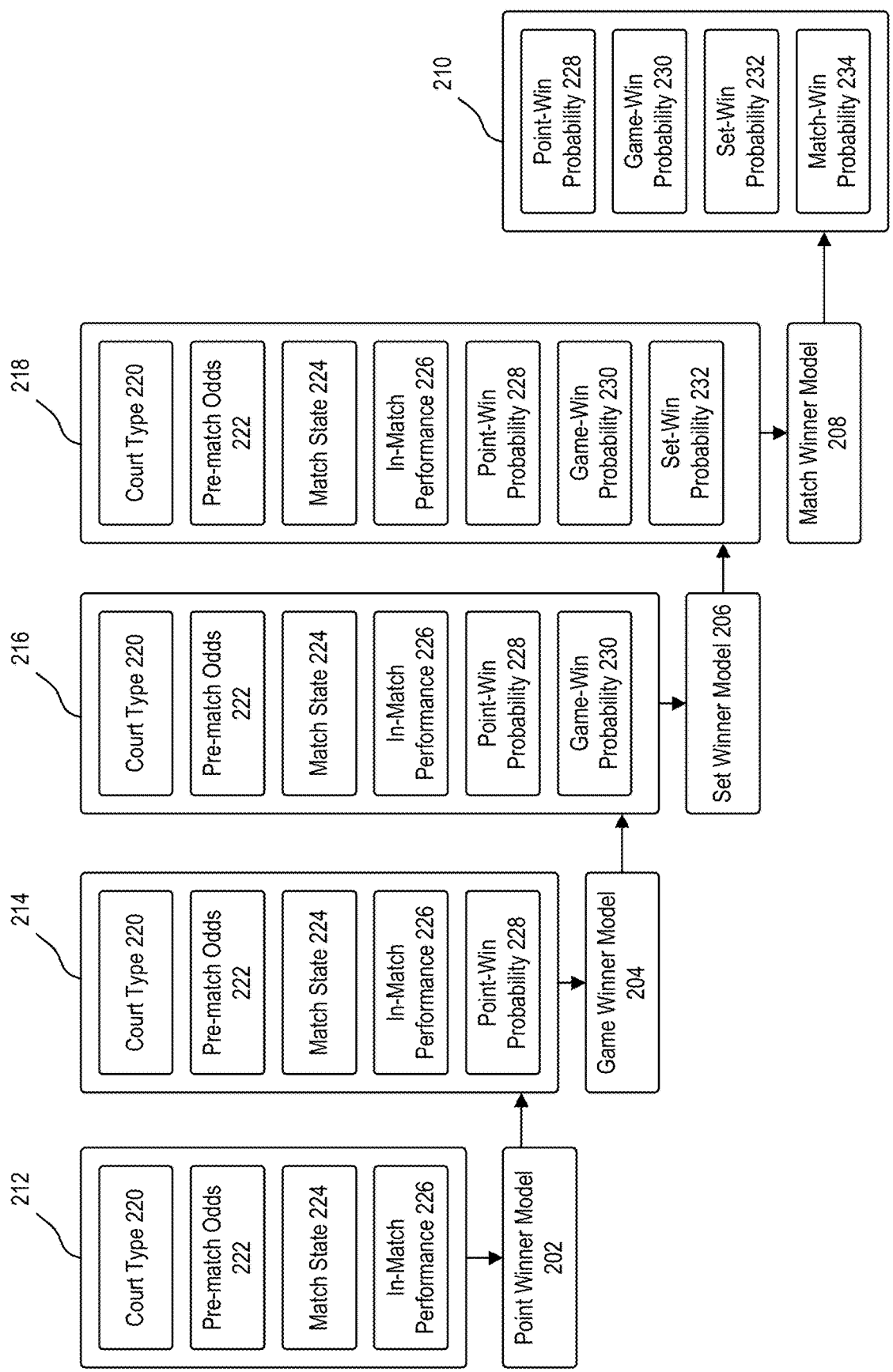
FIG. 2 is a block diagram illustrating prediction models, according to example embodiments.

FIG. 2 is a block diagram illustrating prediction models 126, according to example embodiments. As shown, prediction models 126 may include point winner model 202, game winner model 204, set winner model 206, and match winner model 208. In some embodiments, each of point winner model 202, game winner model 204, set winner model 206, and match winner model 208 may take the form of a gradient boosting tree model.

Point winner model 202 may be configured to predict whether a player will win the next point based on various inputs 212. As shown, inputs 212 may include court type 220 (e.g., grass, clay, hard), pre-match odds 222, and match state 224 (e.g., current game and set score), in-match statistics 226 (e.g., difference in points won, games won, breaks won in the current game, set, and match, serve percentages, return percentages, etc.). Such inputs 212 may be generated by pre-processing agent 116. Point winner model 202 may be trained to predict the outcome of the next point based on inputs 212. For example, the output from point winner model 202 may be a point-win probability 228, which provides a probability of the player winning the next point.

Game winner model 204 may be configured to predict whether the player will win the current game and/or the next game based on various inputs 214. As shown, inputs 214 may be similar to inputs 212. For example, inputs 214 may similarly include court type 220, pre-match odds 222, match state 224, and in-match statistics 226. However, because game winner model 204 is downstream of point winner model in the chain of models, inputs 214 may also include the output from point winner model 202, i.e., point-win probability 228. Such inputs 214 may be generated by pre-processing agent 116. Game winner model 204 may be trained to predict the outcome of the game based on inputs 214. For example, the output from game winner model 204 may be a game-win probability 230, which provides a probability of the player winning the game.

Set winner model 206 may be configured to predict whether the player will win the current set and/or the next set based on various inputs 216. As shown, inputs 216 may be similar to inputs 214. For example, inputs 216 may similarly include court type 220, pre-match odds 222, match state 224, and in-match statistics 226. However, because set winner model 206 is downstream of point winner model 202 and game winner model 204 in the chain of models, inputs 216 may also include the output from point winner model 202, i.e., point-win probability 228, and the output from game winner model 204, i.e., game-win probability 230. Such inputs 214 may be generated by pre-processing agent 116. Set winner model 206 may be trained to predict the outcome of the set based on inputs 216. For example, the output from set winner model 206 may be a set-win probability 232, which provides a probability of the player winning the set.

Match winner model 208 may be configured to predict whether the player will win the current match and/or the next match based on various inputs 218. As shown, inputs 218 may be similar to inputs 216. For example, inputs 218 may similarly include court type 220, pre-match odds 222, match state 224, and in-match statistics 226. However, because match winner model 208 is downstream of point winner model 202, game winner model 204, and set winner model 206 in the chain of models, inputs 218 may also include the output from point winner model 202, i.e., point-win probability 228, the output from game winner model 204, i.e., game-win probability 230, and the output from set winner model 206, i.e., set-win probability 232. Such inputs 218 may be generated by pre-processing agent 116. Match winner model 208 may be trained to predict the outcome of the set based on inputs 218. For example, the output from match winner model 208 may be a match-win probability 234, which provides a probability of the player winning the match.

As shown, as output, prediction models 126 may generate outputs 210. Outputs 210 may include point-win probability 228, game-win probability 230, set-win probability 232, and match-win probability 234.

Figure 3:
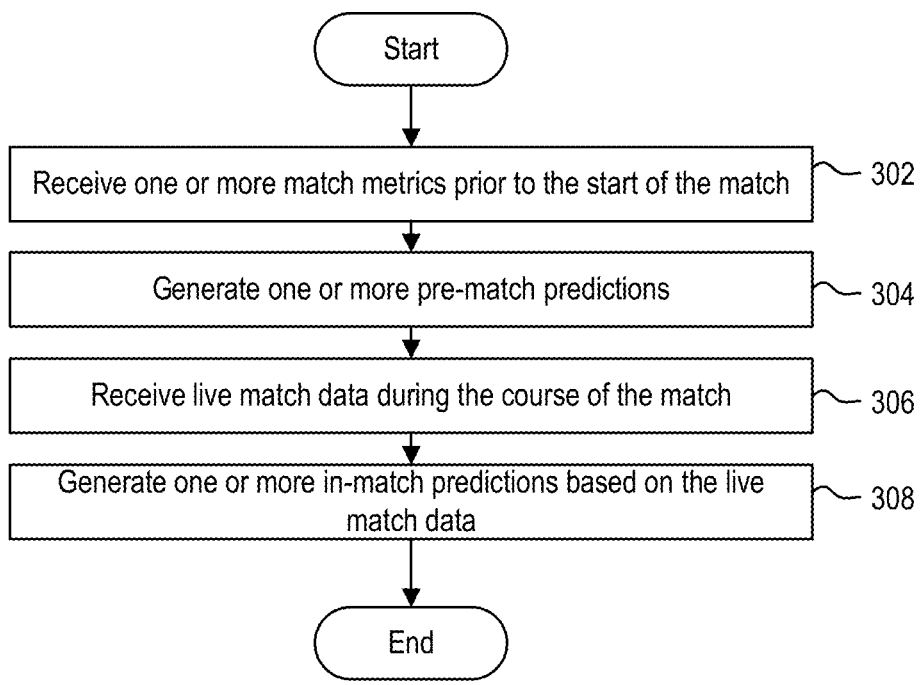
FIG. 3 is a flow diagram illustrating a method of generating pre-match and in-match tennis predictions, according to example embodiments.

FIG. 3 is a flow diagram illustrating a method 300 of generating pre-match and in-match tennis predictions, according to example embodiments. Method 300 may begin at step 302.

At step 302, organization computing system 104 may receive one or more match metrics prior to the start of the match. In some embodiments, the one or more match metrics may correspond to historical match metrics for each player.

At step 304, organization computing system 104 may generate one or more pre-match predictions based on the one or more match metrics received prior to the start of the match. In some embodiments, tennis module 120 may generate the one or more pre-match prediction using prediction models 126.

At step 306, organization computing system 104 may receive live match data during the course of the match. Exemplary live match data may include, but is not limited to, match-state information, match-stats and features, momentum, player one strength, player two strength, player one style, player two style, court-type, weather conditions, and the like.

At step 308, organization computing system 104 may generate one or more in-match predictions based on the live match data. For example, tennis module 120 may generate one or more in-match predictions using prediction models 126. Exemplary in-match predictions may include, but are not limited to, a prediction of what player will win the next point (e.g., 0 or 1), a final score prediction (e.g., multi-class classifier such as {4-0, 4-1, 4-2, 4-3, 0-4, 1-4, 2-4, 3-4}), a final set score prediction (e.g., multi-set classifier such as {6-0, 6-1, 6-2, 6-3, 6-5, 8-5, 8-6, and the reverse}), a final tie break score prediction (e.g., multi-class classifier such as {7-0, 8-1, 8-2, 8-3, 8-4, 8-5, 8-6, and beyond, and reverse}), and/or a final game score prediction (e.g., multi-class classifier such as {2-0, 2-1, 0-2, 1-2, etc.}). In some embodiments, exemplary outputs from prediction models 126 may further include predicted final player statistics (e.g., save percentage, number of aces, number of winners, etc.), predicted serve location or first serve, second serve, "let," double fault, predicted winner location and winner type (e.g., forehand, backhand, volley, smash, etc.), and rally-count. In some embodiments exemplary in-match predictions may further include a breakpoint-analysis, one or more clutch metrics, a momentum analysis, a player plus/minus, and the like.

In some embodiments, method 300 may include a ranking prediction step. For example, a ranking prediction step may come after pre-match predictions generated at step 304 or in-match predictions generated at step 308. For example, rankings prediction module 125 may project updated ATP/WTA World Rankings based on the pre-match predictions and/or the in-match predictions. Such predictions may be generated dynamically throughout the course of the tournament.

Figure 4:
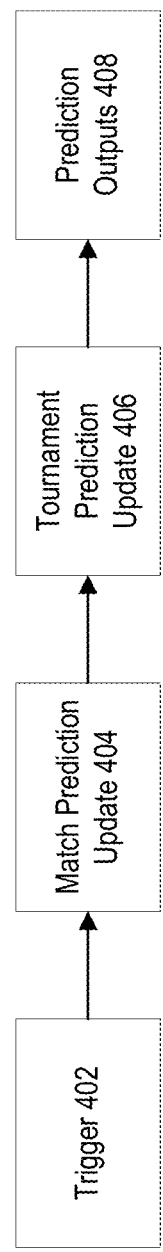
FIG. 4 is a block diagram illustrating the flow of processes for generating an updated tournament prediction.

FIG. 4 is a block diagram 400 illustrating the flow of processes for generating an updated tournament prediction. As shown, at block 402, the processes may begin by detecting a trigger. In some embodiments, the trigger may correspond to a manual trigger (e.g., a request from a user or an administrator) to generate an updated tournament prediction based on live match data. In some embodiments, trigger may correspond to a pre-set trigger (e.g., hourly) to generate an updated tournament prediction based on live match data. In some embodiments, trigger may be an automated trigger, such as when the score in a match of the tournament has changed. Tennis module 120 may be configured to detect such automated triggers based on event information received from tracking systems 102.

At block 404, tennis module 120 may generate an updated match prediction based on the trigger. For example, tennis module 120 may generate one or more in-match predictions using prediction models 126. Exemplary in-match predictions may include, but are not limited to, a prediction of what player will win the next point (e.g., 0 or 1), a final score prediction (e.g., multi-class classifier such as {4-0, 4-1, 4-2, 4-3, 0-4, 1-4, 2-4, 3-4}), a final set score prediction (e.g., multi-set classifier such as {6-0, 6-1, 6-2, 6-3, 6-5, 8-5, 8-6, and the reverse}), a final tie break score prediction (e.g., multi-class classifier such as {7-0, 8-1, 8-2, 8-3, 8-4, 8-5, 8-6, and beyond, and reverse}), and/or a final game score prediction (e.g., multi-class classifier such as {2-0, 2-1, 0-2, 1-2, etc.}).

At block 406, tennis module 120 may generate an updated tournament prediction based on the updated match prediction. For example, based on the update match prediction and the pre-tournament probabilities, tournament prediction module 124 may utilize simulator 132 to re-simulate to outcomes of each matchup.

At block 408, tennis module 120 may output the updated match prediction and the updated tournament prediction to end users.

Figure 5:
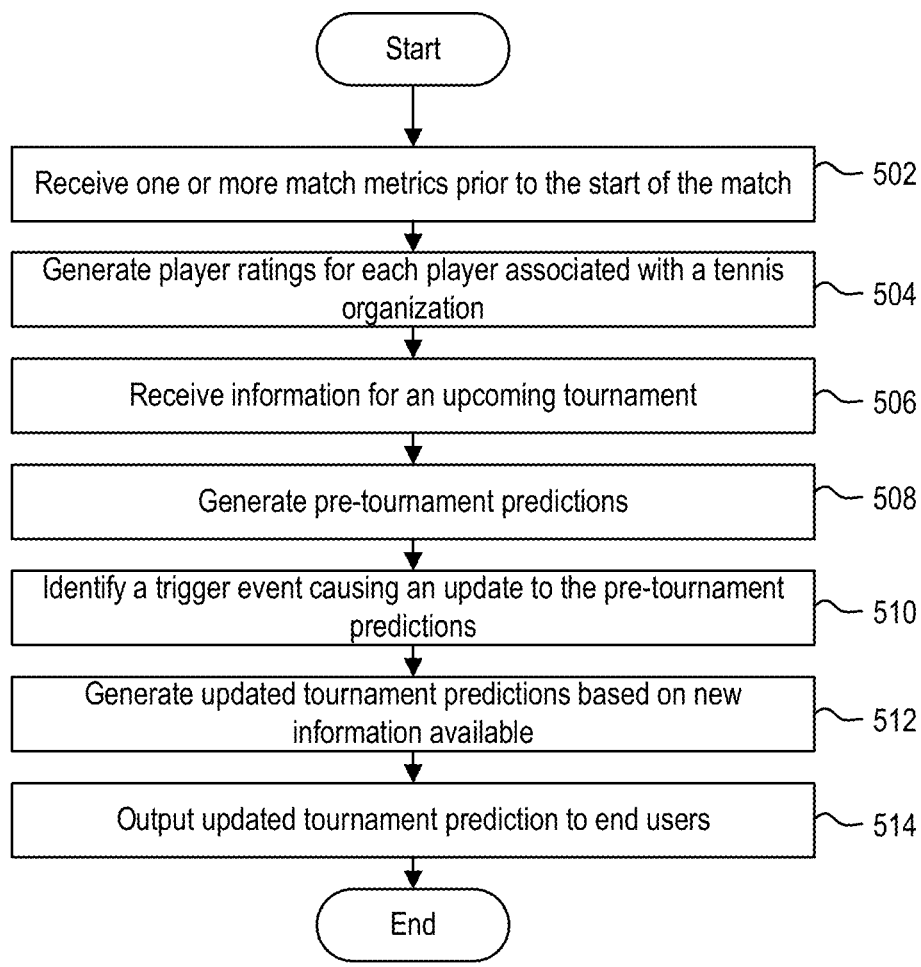
FIG. 5 is a flow diagram illustrating a method of generating a tournament prediction, according to example embodiments.

FIG. 5 is a flow diagram illustrating a method 500 of generating a tournament prediction, according to example embodiments. Method 500 may begin at step 502.

At step 502, organization computing system 104 may receive one or more match metrics prior to the start of the match. In some embodiments, the one or more match metrics may correspond to historical match metrics for each player associated with a tennis organization. Example match metrics may include match file 123 data. Match file 123 data may include scoring data such as, but not limited to, game scores (e.g., 0, 15, 30, 40, deuce, advantage), set scores (e.g., 0-6 or tie-break to 7), and match scores (e.g., 0, 1, 2 or 0-3 in men's grand slams) at each point of a match. In some embodiments, each match file 123 may further include match-stats and features. Exemplary match-stats and features may include, but are not limited to, a number of aces, winners, forced errors, first/second serve percentage, double faults, forehand winners, backhand winners, volleys during the match, and the like.

At step 504, organization computing system 104 may generate player ratings for each player associated with the tennis organization. In some embodiments, pre-tournament module 128 may generate player ratings for each tennis player associated with a tennis league. For example, for all tennis players associated with the ATP and/or the WTA, pre-tournament module 128 may generate a player ranking. In some embodiments, pre-tournament module 128 may generate the player rating based on historical match data associated with each player. In some embodiments, pre-tournament module 128 may generate a player rating for each player based on one or more of Openskill data or ELO data. Such pre-tournament player rating may be routinely updated for subsequent tournament analysis.

At step 506, organization computing system 104 may receive information associated with an upcoming tournament. In some embodiments, the information may include, but is not limited to, the field of players in the tournament and the seeding of the players in the field. Based on the seeding of the players in the field, tennis module 120 may deduce the possible player matchups in the tournament.

At step 508, organization computing system 104 may generate pre-tournament predictions based on the tournament information. Pre-tournament module 128 may generate a pre-tournament likelihood of each player in a tournament advancing to each round based on the player ratings. For example, pre-tournament module 128 may utilize the pre-tournament player ratings and simulator 132 to simulate each round until the final round. In some embodiments, simulator 132 may use a Monte Carlo simulation, where each match win probability may be determined using pre-tournament player rating data. As output, pre-tournament module 128 may generate a table of player vs. player win probabilities. Such table may be used to look up the match win probability of each matchup or potential matchup.

At step 510, organization computing system 104 may identify a trigger event that may cause an updating to the pre-tournament predictions. In some embodiments, the trigger may correspond to a manual trigger (e.g., a request from a user or an administrator) to generate an updated tournament prediction based on live match data. In some embodiments, trigger may correspond to a pre-set trigger (e.g., hourly) to generate an updated tournament prediction based on live match data. In some embodiments, trigger may be an automated trigger, such as when the score in a match of the tournament has changed.

At step 512, responsive to the trigger, organization computing system 104 may generate updated tournament predictions based on new information available. In some embodiments, tennis module 120 may identify any new scores or updates in the tournament as of the trigger event. For example, upon detecting that a score of a specific match has changed, tournament prediction module 124 may identify new match predictions, generated by match prediction module 122, responsive to the updated score. Based on output generated by match prediction module 122, in-tournament module 130 may propagate down the game-level, a set-level, and/or a match-level predictions generated by match prediction module 122 to the update the tournament predictions. Given these game-level, set-level, and match-level predictions, in-tournament module 130 may utilize simulator 132 to re-simulate to outcomes of each matchup.

In some embodiments, tournament prediction module 124 may update the table of player vs. player win probabilities based on the updated predictions.

At step 514, organization computing system 104 may output the updated tournament prediction to end users.

As those skilled in the art recognize, tournament prediction module 124 may continually update the player vs. player win probabilities throughout the tournament based on tournament data.

Figure 6A:
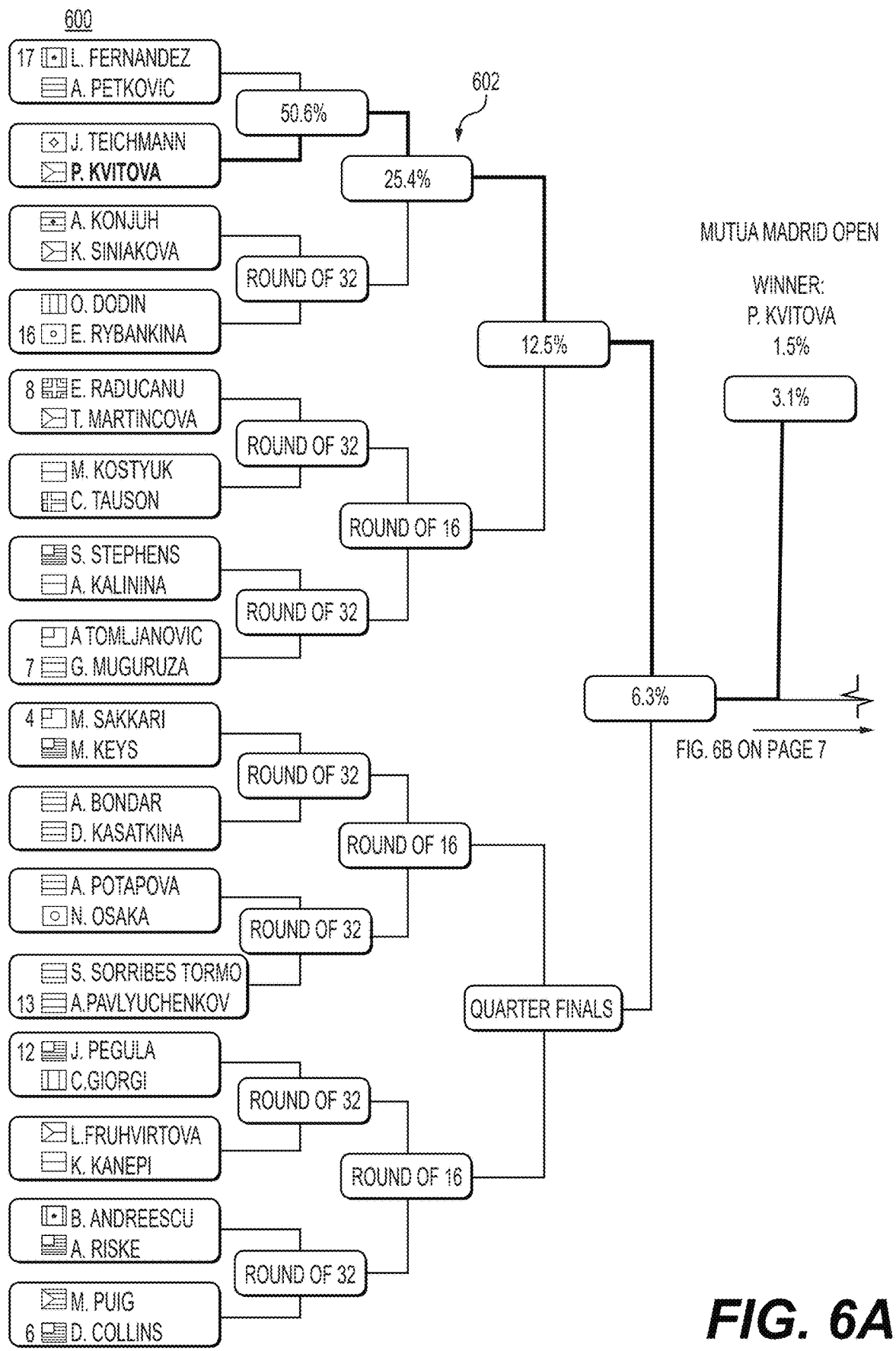
FIG. 6A illustrates an exemplary graphical user interface (GUI) that includes a tournament prediction, according to example embodiments.
Figure 6B:
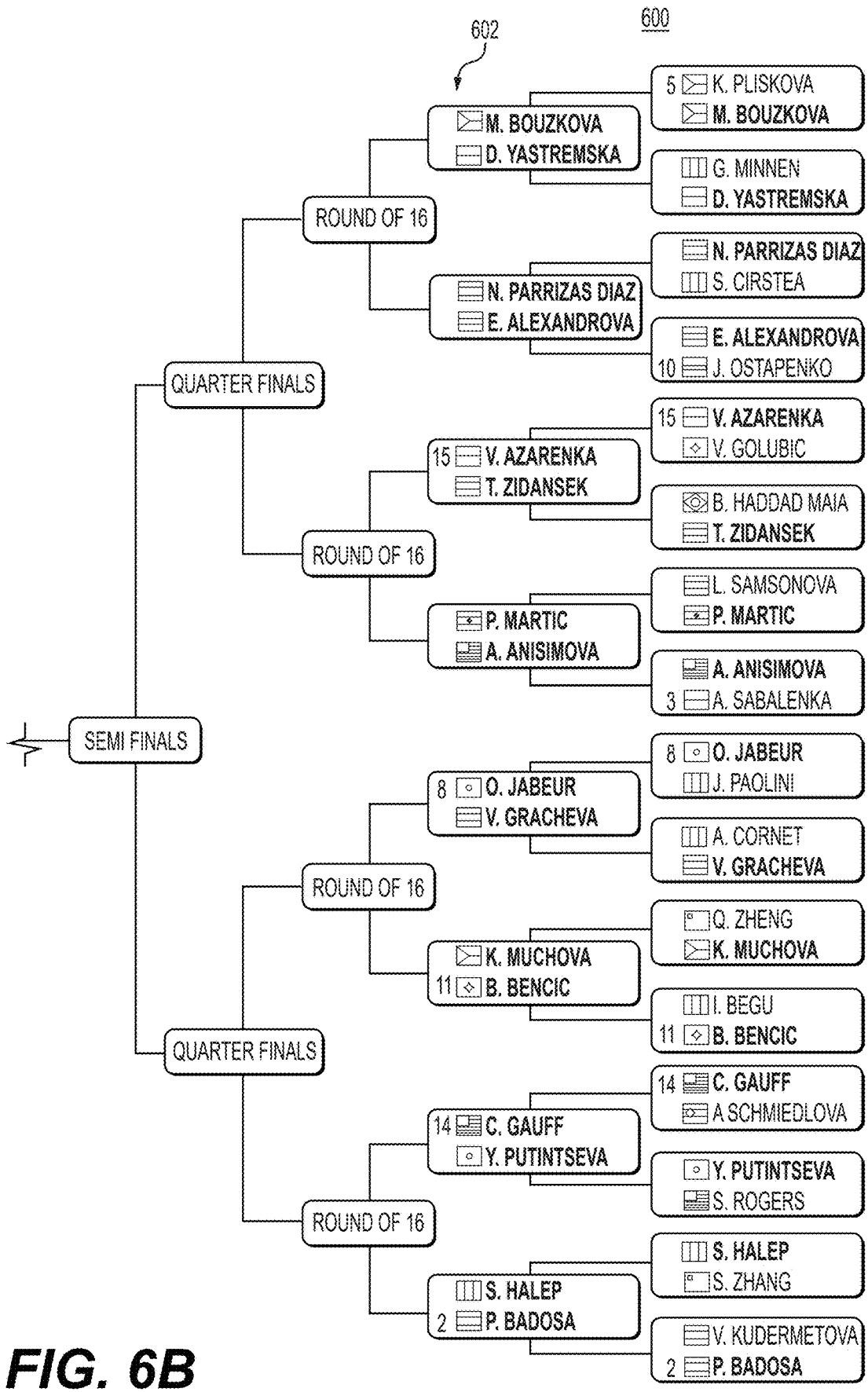
FIG. 6B illustrates an exemplary graphical user interface (GUI) that includes a tournament prediction, according to example embodiments.

FIGS. 6A and 6B illustrates an exemplary graphical user interface (GUI) 600 that includes a tournament prediction, according to example embodiments. As shown, GUI 600 may include a tournament bracket 602. Tournament bracket 602 may illustrate the potential matchups in the tournament based on the pre-tournament seeding of the players. For any player, such as Petra Kvitova, GUI 600 may illustrate the player's odds of advancing to each round of the tournament, as generated by tournament prediction module 124. As shown, Kvitova has a 50.6% chance of advancing to the second round, a 25.4% chance of advancing to the third round, a 12.5% chance of advancing to the quarter finals, a 6.3% chance of advancing to the semifinals, a 3.1% chance of advancing to the finals, and a 1.5% chance of winning the tournament. Such probabilities may be updated, dynamically, during the course of the tournament based on live or real-time game information.

Figure 7A:
FIG. 7A illustrates an exemplary graphical user interface (GUI) that includes a pre-tournament ranking prediction, according to example embodiments.

FIG. 7A illustrates an exemplary graphical user interface (GUI) 700 that includes a ranking prediction, according to example embodiments. As shown, GUI 700 may include a prediction table 702. Prediction table 702 may illustrate a predicted ranking of players at the end of an upcoming tournament. In the example shown, the tournament in question is the 2023 Men's Australian Open. Rankings prediction module 125 may have generated prediction table 702 after the draw for the upcoming tournament has been generated. Accordingly, rankings prediction module 125 may utilize outputs from pre-tournament module 128 to generate prediction table 702, since the tournament has yet to begin.

FIG. 7B illustrates an exemplary graphical user interface (GUI) 750 that includes a ranking prediction, according to example embodiments. As shown, GUI 750 may include an updated prediction table 752. Updated prediction table 752 may illustrate an updated predicted ranking of players at the end of an upcoming tournament, based on action that occurred during the tournament. In the example shown, rankings prediction module 125 may have generated updated prediction table 752 before the quarterfinals-after the round of sixteen. Accordingly, rankings prediction module 125 may utilize outputs from in-tournament module 130 to generate updated prediction table 752, since the tournament is underway.

FIG. 8A illustrates a system bus architecture of computing system 800, according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing system 800, an input device 845 may represent any number of input mechanisms, such as a microphone for speech, a touch-sensitive screen for gesture or graphical input, keyboard, mouse, motion input, speech and so forth. An output device 835 may also be one or more of a number of output mechanisms known to those of skill in the art. In some instances, multimodal systems may enable a user to provide multiple types of input to communicate with computing system 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, output device 835 (e.g., display), and so forth, to carry out the function.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chipset 860 that may control input to and output from processor 855. In this example, chipset 860 outputs information to output 865, such as a display, and may read and write information to storage device 870, which may include magnetic media, and solid state media, for example. Chipset 860 may also read data from and write data to storage device 875 (e.g., RAM). A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage device 870 or storage device 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
    receiving, by a computing system, historical match data associated with a plurality of tennis players, the historical match data comprising historical match metrics;
    generating, by the computing system, player rankings, the player rankings comprising a player ranking for each tennis player of the plurality of tennis players based on the historical match data;
    receiving, by the computing system, information associated with a tennis tournament, the information comprising a subset of tennis players in the tennis tournament and a seeding of each tennis player in the subset of tennis players;
    generating, by the computing system, initial predictions based on the information associated with the tennis tournament and the player rankings;
    receiving, by the computing system, a two-dimensional overhead view of a match from an optically-based system;
    generating, by the computing system, from the two-dimensional overhead view of the match, tracking data of a first tennis player of the plurality of tennis players, tracking data of a second tennis player of the plurality of tennis players, and motion data of an object, wherein the tracking data of the first tennis player and second tennis player includes player identity data and motion data;
    identifying, by the computing system, a trigger event, wherein the trigger event is identified by parsing the tracking data of the first tennis player, the second tennis player, and the motion data of the object for event information related to the match, and wherein the trigger event causes an update to the initial predictions;
    responsive to identifying the trigger event, generating, by the computing system, updated predictions based on in-match data, the in-match data comprising a change to a score in the match between the first tennis player and the second tennis player of the tennis tournament; and
    outputting, by the computing system, the updated predictions.

2. The method of claim 1, further comprising:
    receiving, by the computing system, the in-match data for the match currently in progress, wherein the in-match data comprises one or more of match-state information, match-statistics and features, momentum, player strength information for a first player and a second player, player style information for the first player and the second player, a playing surface type, or weather conditions; and
    generating, by the computing system using one or more prediction models, a live match prediction based on the in-match data.

3. The method of claim 2, wherein generating, by the computing system, the updated predictions based on the in-match data comprises:
    generating the updated predictions based on the live match prediction.

4. The method of claim 1, further comprising:
    projecting, by the computing system, an updated player ranking based on the updated predictions to the tennis tournament.

5. The method of claim 1, wherein generating, by the computing system, the initial predictions based on the information associated with the tennis tournament and the player rankings comprises:
    simulating each round of the tennis tournament based on the player rankings and matchup information.

6. The method of claim 1, wherein generating, by the computing system, the updated predictions based on the in-match data comprises:
    generating one or more of an updated game prediction, an updated set prediction, and an updated match prediction based on the trigger event.

7. The method of claim 1, wherein the updated predictions are generated by a random decision forest model.

8. A non-transitory computer readable medium comprising one or more sequence of instructions, which, when executed by a processor, causes a computing system to perform operations comprising:
    receiving, by the computing system, historical match data associated with a plurality of tennis players, the historical match data comprising historical match metrics;
    generating, by the computing system, player rankings, the player rankings comprising a player ranking for each tennis player of the plurality of tennis players based on the historical match data;
    receiving, by the computing system, a two-dimensional overhead view of a match from an optically-based system;
    generating, by the computing system, from the two-dimensional overhead view of the match, tracking data of a first tennis player of the plurality of tennis players, tracking data of a second tennis player of the plurality of tennis players, and motion data of an object, wherein the tracking data of the first tennis player and second tennis player includes player identity data and motion data;
    receiving, by the computing system, information associated with a tennis tournament, the information comprising a subset of tennis players in the tennis tournament and a seeding of each tennis player in the subset of tennis players;

generating, by the computing system, initial predictions based on the information associated with the tennis tournament and the player rankings;

identifying, by the computing system, a trigger event, wherein the trigger event is identified by parsing the tracking data of the first tennis player, the tracking data of the second tennis player, and the motion data of the object for event information related to the match, and wherein the trigger event causes an update to the initial predictions;

responsive to identifying the trigger event, generating, by the computing system, updated predictions based on in-match data, the in-match data comprising a change to a score in the match between the first tennis player and the second tennis player of the tennis tournament; and outputting, by the computing system, the updated predictions.

9. The non-transitory computer readable medium of claim 8, further comprising:

receiving, by the computing system, the in-match data for the match currently in progress, wherein the in-match data comprises one or more of match-state information, match-statistics and features, momentum, player strength information for a first player and a second player, player style information for the first player and the second player, a playing surface type, or weather conditions; and generating, by the computing system using one or more prediction models, a live match prediction based on the in-match data.

10. The non-transitory computer readable medium of claim 9, wherein generating, by the computing system, the updated predictions based on the in-match data comprises:

generating the updated predictions based on the live match prediction.

11. The non-transitory computer readable medium of claim 8, further comprising:

projecting, by the computing system, an updated player ranking based on the updated predictions to the tennis tournament.

12. The non-transitory computer readable medium of claim 8, wherein generating, by the computing system, the initial predictions based on the information associated with the tennis tournament and the player rankings comprises:

simulating each round of the tennis tournament based on the player rankings and matchup information.

13. The non-transitory computer readable medium of claim 8, wherein generating, by the computing system, the updated predictions based on the in-match data comprises:

generating one or more of an updated game prediction, an updated set prediction, and an updated match prediction based on the trigger event.

14. The non-transitory computer readable medium of claim 8, further comprising:

deriving, by the computing system, a first strength related to the first tennis player from the tracking data of the first tennis player and a second strength related to the second tennis player from the tracking data of the second tennis player, wherein the first strength is indicative of the first tennis player's ranking, and the second strength is indicate indicative of the second tennis player's ranking; and updating the updated predictions based on the first strength and the second strength.

15. A system comprising:

a processor; and a memory having programming instructions stored thereon, which, when executed by the processor, causes the system to perform operations comprising:

receiving historical match data associated with a plurality of tennis players, the historical match data comprising historical match metrics;

generating player rankings, the player rankings comprising a player ranking for each tennis player of the plurality of tennis players based on the historical match data;

receiving information associated with a tennis tournament, the information comprising a subset of tennis players in the tennis tournament and a seeding of each tennis player in the subset of tennis players;

generating initial predictions based on the information associated with the tennis tournament and the player rankings;

receiving a two-dimensional overhead view of a match from an optically-based system;

generating, from the two-dimensional overhead view of the match, tracking data of a first tennis player of the plurality of tennis players, tracking data of a second tennis player of the plurality of tennis players, and motion data of an object, wherein the tracking data of the first tennis player and second tennis player includes player identity data and motion data;

identifying a trigger event, wherein the trigger event is identified by parsing the tracking data of the first tennis player, the tracking data of the second tennis player, and the motion data of the object for event information related to the match, and wherein the trigger event causes an update to the initial predictions;

responsive to identifying the trigger event, generating updated predictions based on in-match data, the in-match data comprising a change to a score in the match between the first tennis player and the second tennis player of the tennis tournament; and outputting the updated predictions.

16. The system of claim 15, wherein the operations further comprise:

receiving the in-match data for the match currently in progress, wherein the in-match data comprises one or more of match-state information, match-statistics and features, momentum, player strength information for a first player and a second player, player style information for the first player and the second player, a playing surface type, or weather conditions; and generating, using one or more prediction models, a live match prediction based on the in-match data.

17. The system of claim 16, wherein generating the updated predictions based on the in-match data comprises:

generating the updated predictions based on the live match prediction.

18. The system of claim 15, wherein the operations further comprise:

projecting an updated player ranking based on the updated predictions to the tennis tournament.

19. The system of claim 15, wherein generating the initial predictions based on the information associated with the tennis tournament and the player rankings comprises:

simulating each round of the tennis tournament based on the player rankings and matchup information.

20. The system of claim 15, wherein the event information includes the first tennis player scoring a point against the second tennis player.

\* \* \* \* \*